(12) United States Patent
Omi

(10) Patent No.: US 6,588,993 B2
(45) Date of Patent: Jul. 8, 2003

(54) CUTTING TOOL, TOOL HOLDER AND TOOL ASSEMBLY

(75) Inventor: Shohei Omi, Anjo (JP)

(73) Assignee: Omi Kogyo Co., Ltd., Aichi-Ken (JP)

( * ) Notice: Subject to any disclaimer, the term of this patent is extended or adjusted under 35 U.S.C. 154(b) by 16 days.

(21) Appl. No.: 09/796,251

(22) Filed: Feb. 28, 2001

(65) Prior Publication Data

US 2002/0003992 A1 Jan. 10, 2002

(30) Foreign Application Priority Data

Jun. 30, 2000 (JP) ....................................... 2000-198628

(51) Int. Cl.$^7$ ............................................. B23B 31/107
(52) U.S. Cl. ........................... 408/226; 279/71; 279/81; 408/204
(58) Field of Search ................................ 408/226, 204, 408/240; 279/71, 74, 75, 78, 81, 82, 905, 906, 125

(56) References Cited

U.S. PATENT DOCUMENTS

| | | | | |
|---|---|---|---|---|
| 1,112,348 A | * | 9/1914 | Barnes | 279/74 |
| 1,112,349 A | * | 9/1914 | Barnes | 279/74 |
| 1,346,341 A | * | 7/1920 | Schinkez | 279/19.4 |
| 2,990,188 A | * | 6/1961 | Better et al. | 279/75 |
| 3,342,502 A | * | 9/1967 | Young | 279/103 |
| 3,536,335 A | * | 10/1970 | Schmuck | 279/81 |
| 3,801,115 A | * | 4/1974 | Benjamin | 279/81 |
| 4,708,548 A | * | 11/1987 | Taylor et al. | 279/140 |
| 5,464,230 A | | 11/1995 | Rohm | |
| 6,250,856 B1 | * | 6/2001 | Miyanaga | 279/75 |

FOREIGN PATENT DOCUMENTS

| | | |
|---|---|---|
| DE | 1777214 | 7/1971 |
| JP | 2558054 | 9/1996 |

* cited by examiner

*Primary Examiner*—Daniel W. Howell
(74) *Attorney, Agent, or Firm*—Merchant & Gould P.C.

(57) ABSTRACT

A tool holder holds a shank of a cutter tool. The tool holder comprises a supporting cylinder. An operation body moves between a locking position and an unlocking position A locking member is supported by the supporting cylinder. The locking member moves radially in accordance with the position of the operation body. An engaging member is located between the supporting cylinder and the operation body. The engaging member moves between an engaging position and a disengaging position. When the engaging member is in the engaging position, the operation body is prevented from moving relative to the supporting cylinder and is held in the unlocking position and when the engaging member is in the disengaging position the operation body is allowed to move relative to the supporting cylinder. This mechanism facilitates smooth insertion of the cutter into the supporting cylinder.

10 Claims, 11 Drawing Sheets

CUTTING TOOL, TOOL HOLDER AND TOOL ASSEMBLY

BACKGROUND OF THE INVENTION

The present invention relates to a cutter such as a boring cutter, a holder for holding the cutter, and a tool assembly that includes the cutter and the tool holder.

DESCRIPTION OF THE RELATED ART

Japanese Patent No. 2558054 discloses an annular cutter 106 having a shank 109 fitted in a supporting hole 101a of a supporting cylinder 101. FIGS. 9–13(d) represent the cutter of the Japanese patent. A sleeve 104 is rotatably supported at the tip of the supporting cylinder 101. As shown in FIGS. 11 and 12, a plurality of receiving holes 107a are defined in the supporting cylinder 101 so that they can be associated with a plurality of recesses 104a formed on the sleeve 104, respectively. Each receiving hole 107a contains a locking ball 107.

The supporting hole 101a contains a bearing piece 102. The bearing piece 102 is urged by a spring 110 toward the opening of the supporting cylinder 101. As shown in FIGS. 9 and 11, in the state where the shank 109 is not fitted in the supporting hole 101a, the balls 107 enter the respective recesses 104a of the sleeve 104 and are retained in this state by the bearing piece 102. The state of FIG. 9 is refered to as the unlocked state. The sleeve 104 is urged by a spring (not shown) in one rotational direction and is maintained in the state shown in FIGS. 9 and 11 when the balls 107 engage with the recesses 104a.

As shown in FIGS. 13(a) and 13(b), the shank 109 has, on the outer circumferential face, a plurality of planar guiding faces 109a associated with the balls 107 respectively. Formed in each guiding face 109a is an engaging dent 109b that is engageable with the associated ball 107.

When the cutter 106 is fitted in the supporting cylinder 101, the shank 109 is inserted in the supporting hole 101a of the supporting cylinder 101, as shown in FIGS. 9 and 11, and the shank 109 pushes the bearing piece 102. Further, the engaging dents 109b are located at positions where they oppose the balls 107, respectively. Then, the spring turns the sleeve 104 with respect to the supporting cylinder 101 to push the balls 107 out from the recesses 104a. Thus, as shown in FIGS. 10 and 12, the balls 107 are engaged with the engaging dents 109b respectively to lock the cutter 106 against the supporting cylinder 101.

The cutter 106 is unlocked by turning the sleeve 104 against the urging force of the spring from the state shown in FIG. 12 to the state shown in FIG. 11.

In the unlocked state of FIGS. 9 and 11, the sleeve 104 is maintained in position with respect to the supporting cylinder 101 by the balls 107, which are held in position by the bearing piece 102. The balls 107 can move slightly within the recesses 104a of the sleeve 104 and within the receiving holes 107a of the supporting cylinder 101. Thus, in the unlocked state, the sleeve 104 is not firmly locked with respect to the supporting cylinder 101, making the position of the sleeve 104 unstable. This makes it difficult to stabilize the balls 107 in the unlocked state.

The bearing piece 102 is located in the supporting hole 101a of the supporting cylinder 101. This makes the internal structure of the supporting cylinder 101 complicated.

The outside diameter of the shank 109 is substantially equal to the inside diameter of the receiving hole 101a of the supporting cylinder 101. This is so that the shank 109 is held firmly in the supporting cylinder 101 with no slack. However, this makes it difficult to insert the shank 109 into the receiving hole 101a.

As shown in FIG. 11, in the unlocked state, the balls 107 slightly protrude radially inward from the inner circumferential surface of the receiving hole 101a. Thus, when the shank 109 is inserted in the supporting cylinder 101, the end face of the shank 109 engages against the balls 107 unless the guiding faces 109a are aligned with the balls 107. This prevents smooth insertion of the shank 109 into the receiving hole 101a and also damages the balls 107. In order to solve this problem, it is essential to prevent the balls 107 from protruding radially inward from the inner circumferential surface of the receiving hole 101a, in the unlocked state. However, this limits the degree of freedom in designing the supporting cylinder 101 and 109.

Japanese Patent No. 2558054 discloses another cutter 106 as shown in FIGS. 13(c) and 13(d). In this cutter 106, the shank 109 has a large-diameter portion 109c and a small-diameter portion 109d. A step 109e is formed between the large-diameter portion 109c and the small-diameter portion 109d. The diameter of the large-diameter portion 109c is substantially equal to the diameter of the receiving hole 101a of the supporting cylinder 101. The small-diameter portion 109d facilitates the operation of inserting the shank 109 into the supporting hole 101a. Each engaging dent 109b is formed on both the large-diameter portion 109c and the small-diameter portion 109d.

In the cutter 106 shown in FIG. 13(b), the step 109e engages the locking balls 107 unless the engaging dents 109b and the balls 107 are aligned. Therefore, to avoid such engagement, it is essential to prevent the balls 107 from protruding radially inward from the inner circumferential surface of the receiving hole 101a, in the unlocked state. This limits the degree of freedom in designing the supporting cylinder 101 and the shank 109, as in the case of the cutter of FIG. 13(a).

SUMMARY OF THE INVENTION

It is an objective of the present invention to position securely the operating body with respect to the supporting cylinder.

It is another objective of the present invention to facilitate smooth insertion of the cutter into the supporting cylinder and also to increase the degree of freedom in designing the supporting cylinder and the cutter.

To achieve the above objective, the present invention provides a tool holder for holding a shank of a cutter tool. The tool holder comprises a supporting cylinder. A supporting hole that receives the shank is formed in the supporting cylinder. A locking body moves between a locking position and an unlocking position. A locking member is supported by the supporting cylinder. When the locking body is located in the locking position, the locking member is moved radially inward with respect to the supporting cylinder by the body to engage with the shank. When the locking body is located in the unlocking position, the locking member is allowed to move in the radially outward direction of the supporting cylinder to release the shank. An engaging member is located between the supporting cylinder and the locking body. The engaging member moves between an engaging position, at which the engaging member locks the locking body with respect to the supporting cylinder, and a disengaging position, at which the engaging member releases the locking body from the supporting cylinder.

When the engaging member is in the engaging position, the locking operation body is prevented from moving relative to the supporting cylinder and is held in the unlocking position, and when the engaging member is in the disengaging position, the locking operation body is allowed to move relative to the supporting cylinder.

To achieve the above objective, the present invention also provides a cutter tool that fits in a tool holder. The tool holder has a supporting hole that receives a shank of the cutter and a locking member for engaging the shank such that the locking member holds the shank in the supporting hole. The cutter tool comprises a large diameter section for contacting an inner wall that defines the supporting hole. A small diameter section, the diameter of which is smaller than that of the large diameter section. The small diameter section is adjacent to the large diameter section and is located at the distal end of the shank. A recess is located entirely in the small diameter section, and the locking member enters the recess.

To achieve the above objective, the present invention also provides a tool assembly. The tool assembly omprises a cutter tool having a shank. The shank has a large diameter section and a small diameter section. The small diameter section is adjacent to the large diameter section and is located at the distal end of the shank. A tool holder is attaching the shank. The tool holder comprises a supporting cylinder. The supporting cylinder has a supporting hole being inserted in the shank of the cutter. An inner wall that defines the supporting hole has a first inner wall corresponding to the small diameter section of the shank and a second inner wall contacting with the large diameter section of the shank. The diameter of the first inner wall is smaller than the diameter of the second inner wall. A locking body is supported to move between a locking position and an unlocking position. A locking member is supported by the supporting cylinder to move in the radial direction. When the locking operation body is located in the locking position, the locking member moves to an inner side of radial direction by the locking body to engage with the shank. When the locking body is located in the unlocking position, the locking member is allowed to move to an outer side of radial direction to release from the shank.

Other aspects and advantages of the invention will become apparent from the following description, taken in conjunction with the accompanying drawings, illustrating by way of example the principles of the invention.

BRIEF DESCRIPTION OF THE DRAWINGS

The invention together with the objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will be described referring to FIGS. 1 to 7(b).

Figure 1:
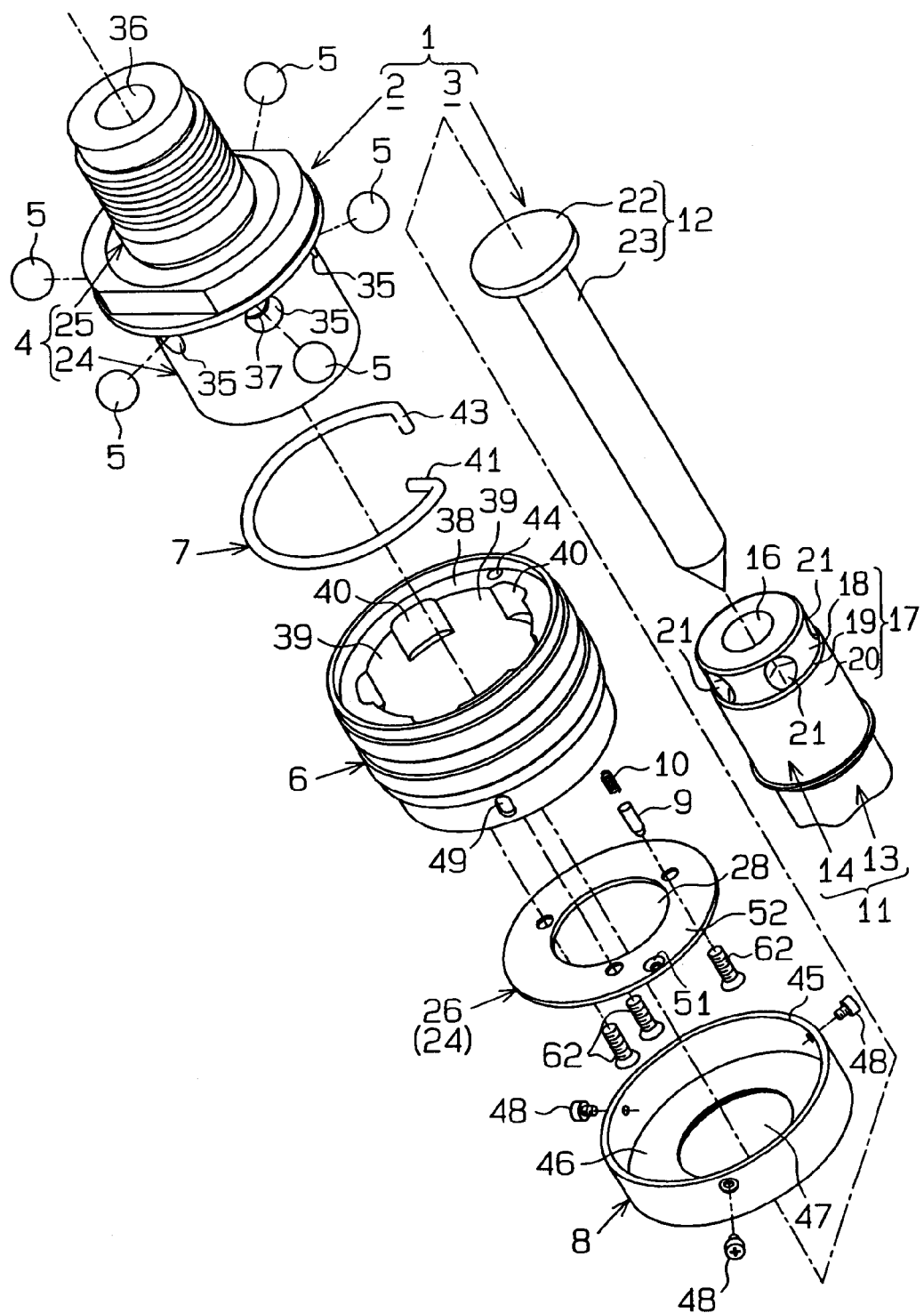
FIG. 1 is an exploded perspective view of the tool holder and the tool in a first embodiment of the present invention.

As shown in FIG. 1, a cutting tool coupler apparatus 1 is provided with a tool holder 2 and a cutter tool 3. The holder 2 includes a supporting cylinder 4, locking balls 5 (also referred to as locking members), a locking cylinder 6 (also referred to as a locking body), a torsion spring 7 (also referred to as a resilient body), an unlocking cylinder 8 (also referred to as an unlocking body), a movable engaging pin 9 (also referred to as a movable engaging member) and a coil spring 10 (also referred to as a resilient member). The cutter 3 has an annular form and includes a boring cylinder 11 and a centering pin 12, which is inserted into the boring cylinder 11.

Figure 2:
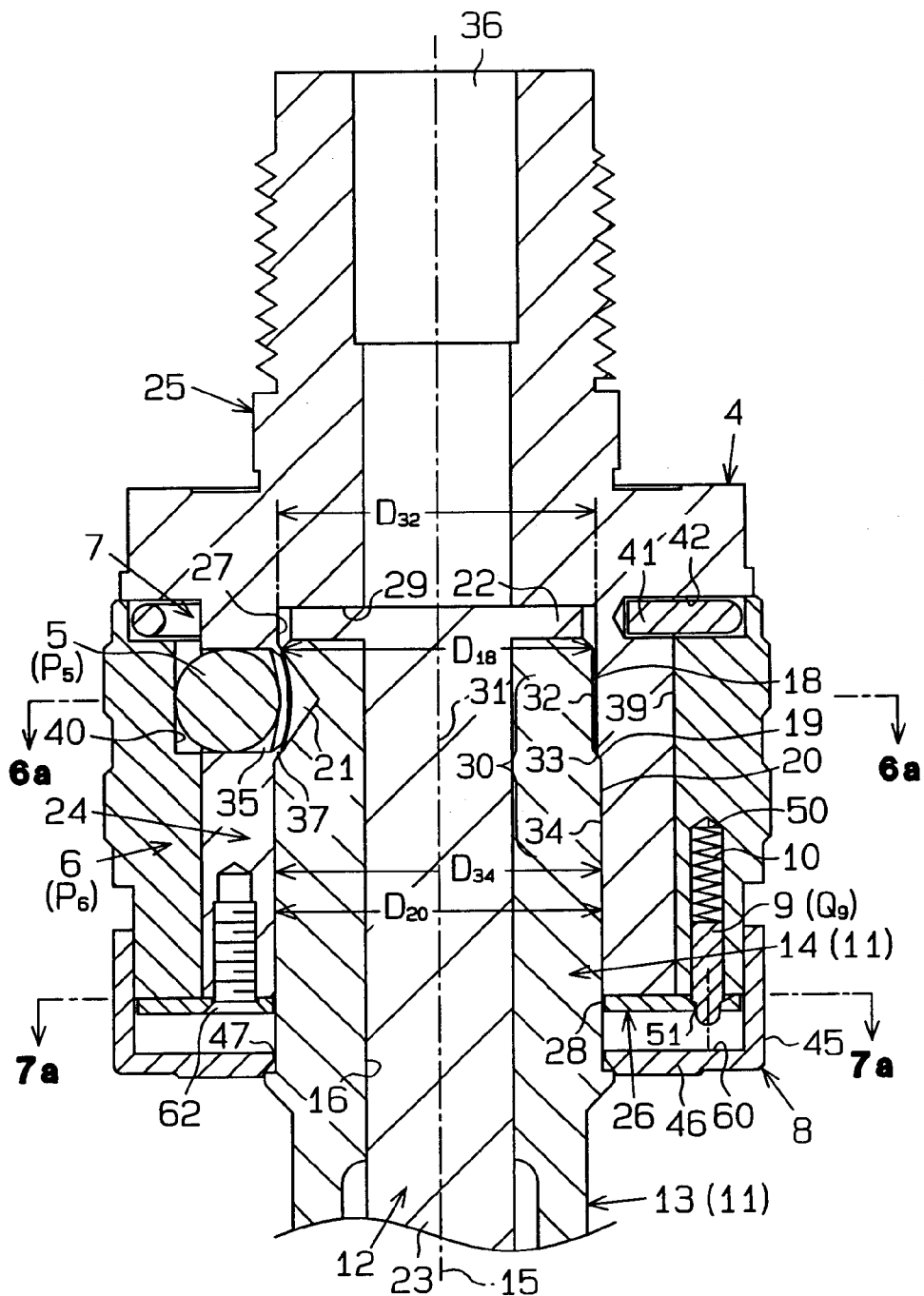
FIG. 2 is a partial cross-sectional view showing a tool assembly where the cutter tool is inserted in the tool holder.
Figure 3:
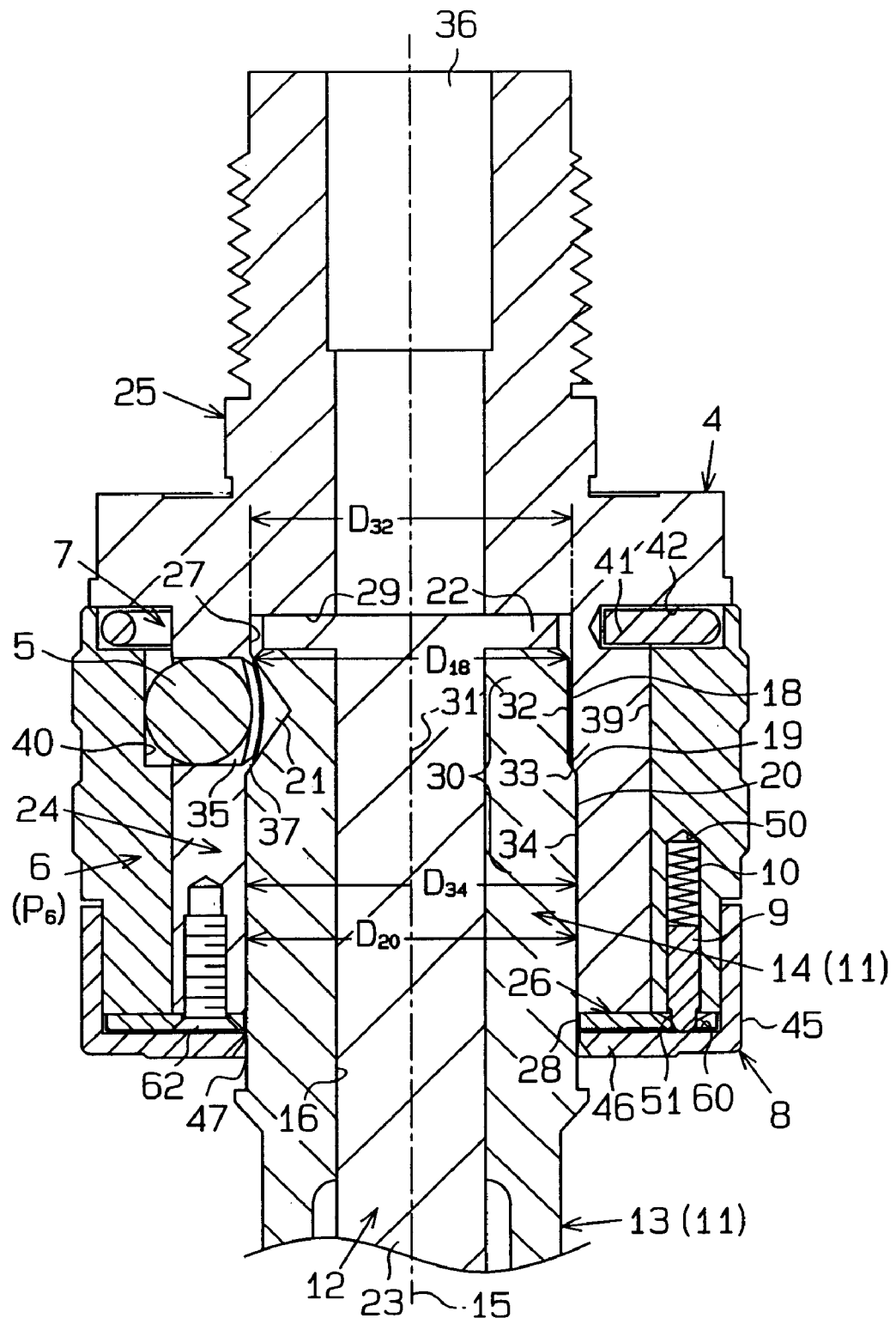
FIG. 3 is a partial cross-sectional view of the tool assembly showing disengagement of an engaging pin.

The boring cylinder 11 is provided with a boring blade 13, which has a cutting edge (not shown) and a shank 14. As shown in FIGS. 1 and 2, the boring cylinder 11 includes a through hole 16 that is concentric with the rotational axis line 15 of the cutter 3. The cylindrical shank 14 has a first outer circumferential section 18 and an adjacent second outer circumferential section 20. A step 19 is located between the first and second sections 18, 20. The outside diameter D18 of the first outer circumferential section 18 is slightly smaller than that D20 of the second outer circumferential section 20. The first outer circumferential section 18 has a plurality of recesses 21 (five in this embodiment) arranged at regular intervals around the rotational axis 15.

As shown in FIG. 1, the centering pin 12 has a head 22 and a shaft 23. The shaft 23 is inserted in the through hole 16 such that the head 22 engages with the end face of the shank 14 and such that the tip of the shaft 23 protrudes slightly from the tip of the boring blade 13.

The supporting cylinder 4 includes a main barrel 24 and a fitting barrel 25. The fitting barrel 25 is held in a machine tool (not shown). A ring-shaped collar 26 is fixed to the end face of the main barrel 24 by screws 62. The main barrel 24 includes an axial supporting hole 27. The supporting hole 27 is concentric with an opening 28 of the collar 26. A fitting hole 36, the diameter of which is smaller than that of the supporting hole 27, extends axially through the fitting barrel 25. The fitting hole 36 and the supporting hole 27 communicate with each other. An annular bearing face 29 is formed between the supporting hole 27 and the fitting hole 36. The plane of the bearing face 29 intersects the axis of the supporting cylinder 4.

The inner surface of the supporting hole 27 includes a first inner circumferential surface 32 and a second inner circumferential surface 34, which are adjacent. A step 33 is located between the first and second surfaces 32, 34. The inside diameter D32 of the first inner circumferential surface 32 is slightly smaller than the inside diameter D34 of the second inner circumferential surface 34. The inside diameter D32 of the first inner circumferential surface 32 is slightly greater than the outside diameter D18 of the first outer circumferential surface 18 of the shank 14. The inside diameter D34 of the second inner circumferential surface 34 and the outside diameter D20 of the second outer circumferential section 20 of the shank 14 are substantially equal within an optimum fitting tolerance range.

The main barrel 24 has a plurality of locking holes 35 (five in this embodiment) at equiangular intervals in positions where they oppose the first inner circumferential surface 32. Each locking hole 35 extends in the radial direction of the supporting cylinder 4.

A plurality of steel locking balls 5 (five in this embodiment) are fitted in the locking holes 35, respectively. Each locking ball 5 can move within the associated locking hole 35 in the radial direction of the supporting cylinder 4 and can not escape from the supporting hole 27, since each is retained by a wall 37 formed along the inner peripheral edge of each locking hole 35.

Figure 6A:
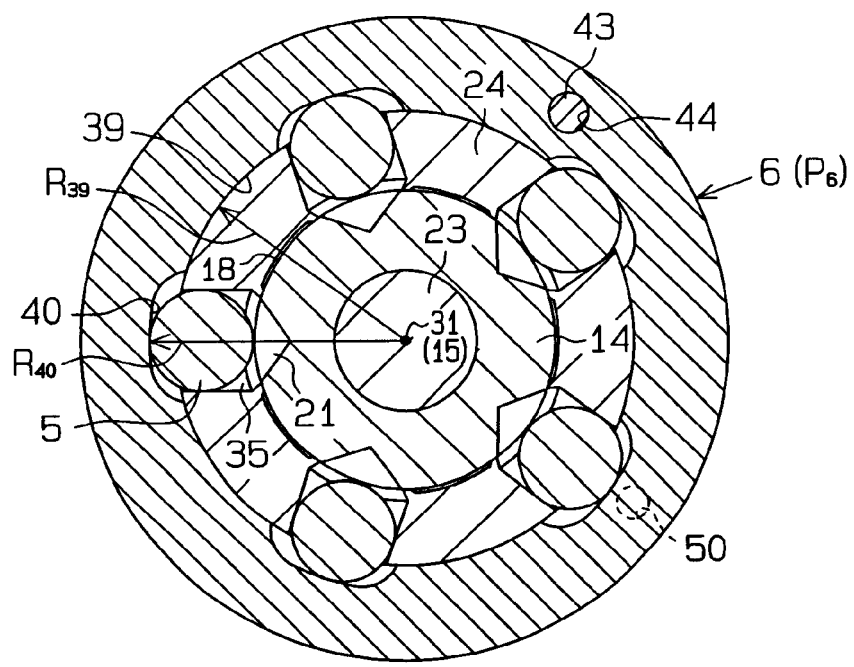
FIG. 6(a) is a cross-sectional view taken along the line 6a—6a in FIG. 2.

The locking cylinder 6 is fitted to cover the main barrel 24 and rotates around the main barrel 24. The collar 26 abuts against the end face of the locking cylinder 6 and thus retains the cylinder 6 on the main barrel 24. The locking operation cylinder 6 has on its inner circumferential surface an annular locking section 38. The locking section 38 includes a plurality of locking faces 39 (five in this embodiment) and a plurality of unlocking faces 40 (five in this embodiment), which are arranged alternately at equiangular intervals. The locking faces 39 are on the inner circumferential surface of the locking cylinder 6, and the unlocking faces 40 are located radially outward of the locking faces 39. Each unlocking face 40 defines a recess between two adjacent locking faces 39. Each recess receives a locking ball 5. As shown in FIG. 6(a), the distance R39 from the rotational axis 31 to the locking face 39 is less than the distance R40 from the axis 31 to the unlocking face 40. When the locking cylinder 6 is rotated manually, the locking faces 39 and the unlocking faces 40 move in and out of radial alignment with locking holes 35.

As shown in FIGS. 1 and 2, the torsion spring 7 is located between the inner circumferential surface of the locking cylinder 6 and the outer circumferential surface of the main barrel 24 and surrounds the main barrel 24. One end 41 of the torsion spring 7 is engaged with a hole 42 formed in the main barrel 24. The other end 43 of the torsion spring 7 is engaged with a hole 44, which is shown in FIG. 1, formed in the locking cylinder 6.

FIGS. 2 and 6(a) show a state where the locking cylinder 6 is in the unlocking position P6 against the resistance of the torsion spring 7. In this state, the locking balls 5 can enter the recesses defined by the unlocking faces 40, respectively. When the locking balls 5 abut against the unlocking faces 40, respectively, each ball 5 protrudes by a predetermined radial distance inward from the first inner circumferential surface 32 of the main barrel 24. The radial protrusion distance is chosen to be not more than half of the difference between the inside diameter D32 of the first inner circumferential surface 32 and the outside diameter D18 of the first outer circumferential surface 18.

Figure 5:
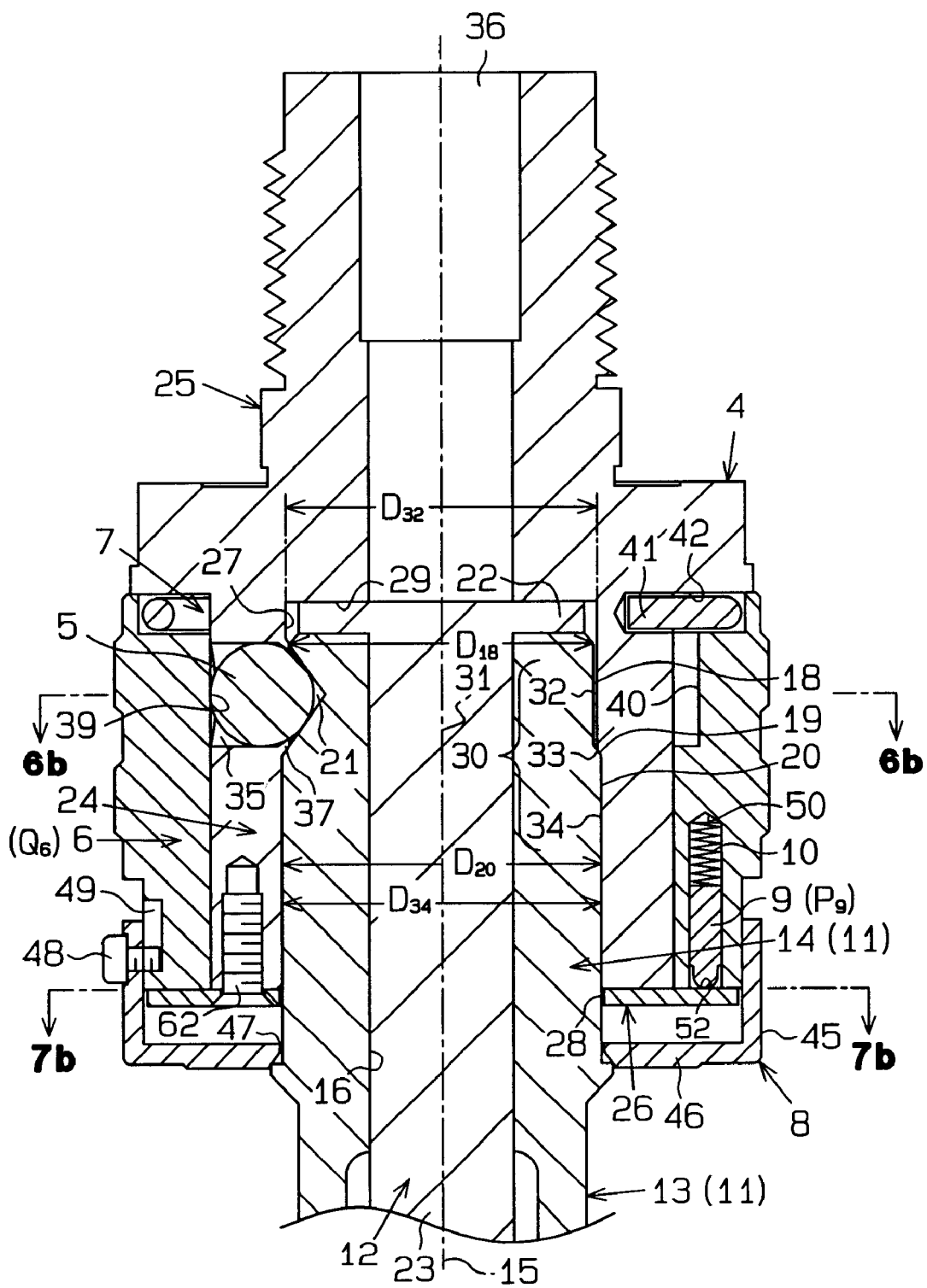
FIG. 5 is a partial cross-sectional view of the tool assembly showing a state where the cutter tool is locked in the tool holder.
Figure 6B:
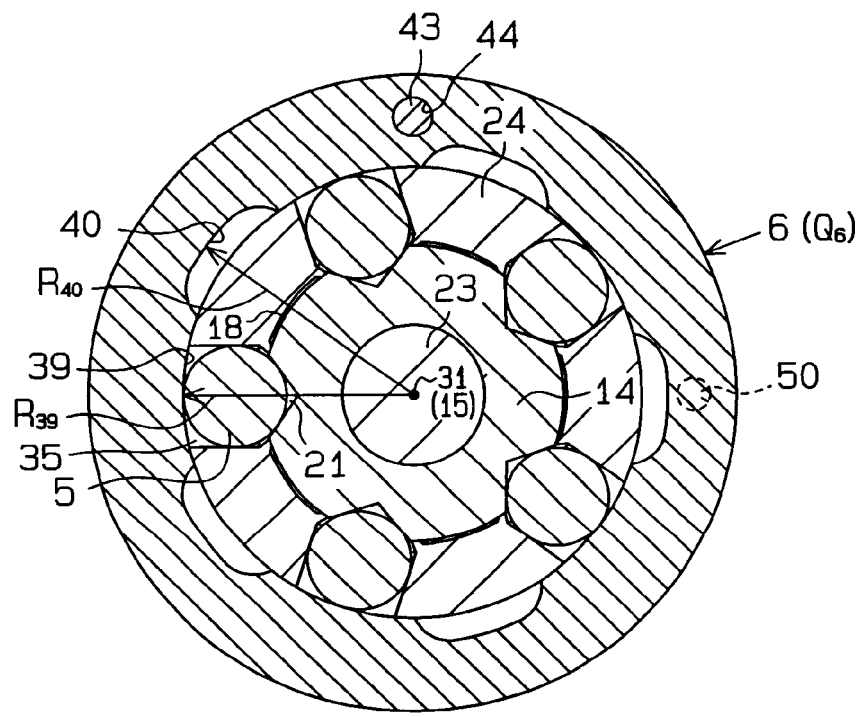
FIG. 6(b) is a cross-sectional view taken along the line 6b—6b in FIG. 5.

FIGS. 5 and 6(b) show a state where the torsion spring 7 urges the locking cylinder 6 to rotate to the locking position Q6. In this state, the locking balls 5 are pressed by the locking faces 39, respectively, to protrude a predetermined radial distance inward from the first inner circumferential surface 32. This radial protrusion distance is chosen to be larger than half of the difference between the inside diameter D32 of the first inner circumferential surface 32 and the outside diameter D18 of the first outer circumferential surface 18.

As shown in FIGS. 1, 2 and 5, the unlocking cylinder 8, which is connected to the lower end of the locking cylinder 6, has a peripheral wall 45 and a bottom plate 46. The bottom plate 46 includes an opening 47, which has a diameter substantially equal to that of the opening 28. A plurality of guide pins 48 (three in this embodiment) are threaded and screwed into the peripheral wall 45 at equiangular intervals. The locking cylinder 6 has a plurality of guide slots 49 (three in this embodiment) formed at equiangular intervals on the outer circumferential surface thereof. The guide pins 48 are fitted in the guide slots 49, respectively. The unlocking cylinder 8 is allowed to move axially with respect to the locking cylinder 6 within a range corresponding to the length of each guide slot 49.

The engaging pin 9 and the coil spring 10 are fitted in a small hole 50 formed in the end face of the locking cylinder 6. An engaging hole 51 is formed in the collar 26. The collar 26 has an upper face 52 that abuts the end face of the locking cylinder 6. When disengaged, the engaging pin 9 engages the upper face 52. As shown in FIGS. 2 and 6(a), when the locking cylinder 6 is in the unlocking position P6, the engaging pin 9 is aligned with the engaging hole 51. Thus, the coil spring 10 urges the engaging pin 9 into the engaging hole 51 (engaging position Q9). As shown in FIGS. 5 and 6, when the locking cylinder 6 is in the locking position Q6, the engaging pin 9 is not aligned with the engaging hole 51, as shown in FIG. 7(b). Therefore, the engaging pin 9 is located in a nonengaging position P9 where it engages the upper face 52 of the collar 26.

As shown in FIGS. 4(a) to 4(d), the engaging pin 9 has a large-diameter section 53 and a small-diameter section 55. A step 54 is formed between the large-diameter section 53 and the small-diameter section 55. The small-diameter section 55 has a cylindrical surface 56 and a semispherical, or rounded, tip 57. The engaging hole 51 includes a cylindrical wall 58 and a tapered surface 59.

Figure 4A:
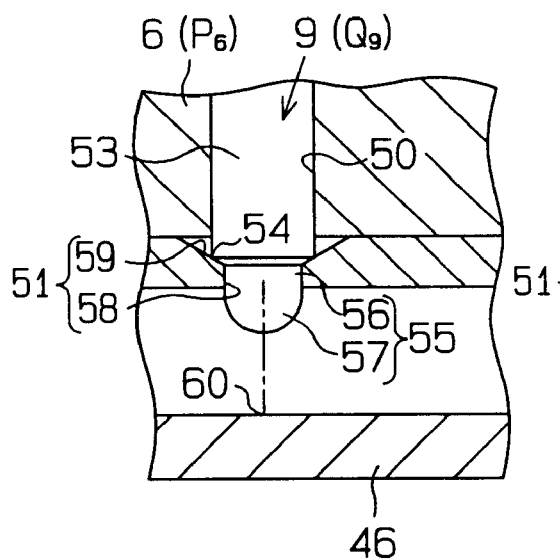
FIGS. 4(a), 4(b), 4(c), and 4(d) are enlarged partial cross-sectional views of the tool assembly showing a process by which the engaging pin is disengaged.
Figure 4B:
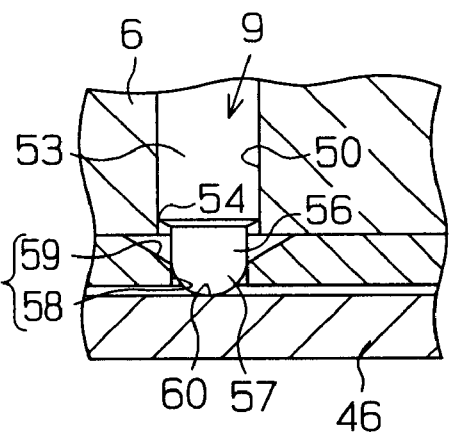
Figure 7A:
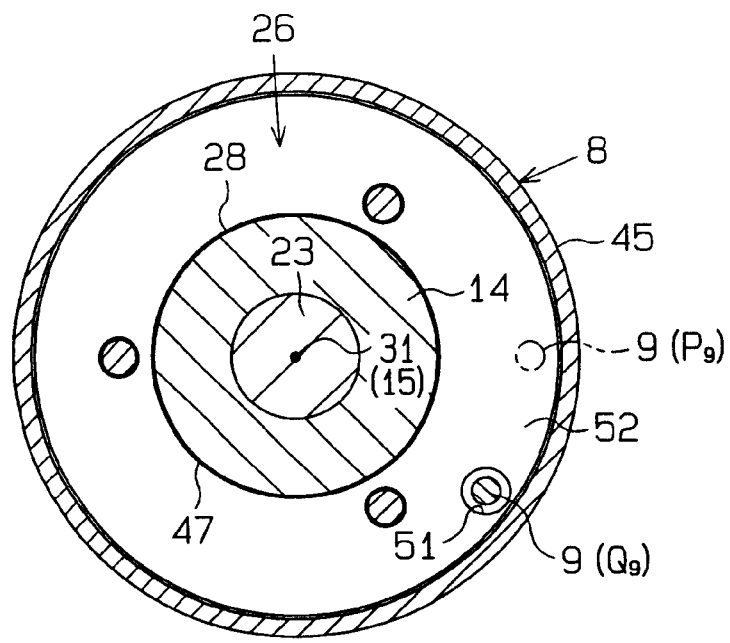
FIG. 7(a) is a cross-sectional view taken along the line 7a—7a in FIG. 2.
Figure 7B:
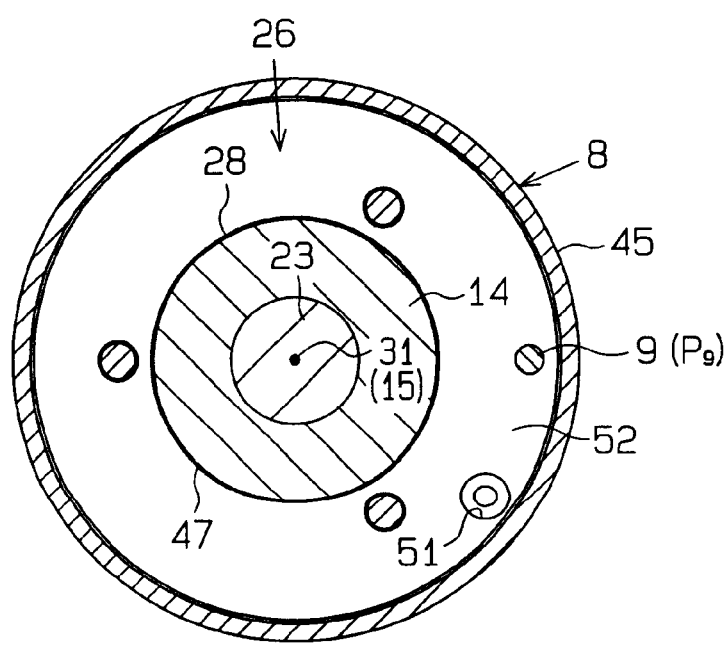
FIG. 7(b) is a cross-sectional view taken along the line 7b—7b in FIG. 5.

As shown in FIGS. 2, 4(a) and 7(a), in the state where the engaging pin 9 is in the engaging position Q9, the step 54 engages the tapered face 59. Further, the cylindrical surface 56 of the small-diameter portion 55 engages the wall 58 of the engaging hole 51, and the rounded tip 57 of the small-diameter portion 55 protrudes from the collar 26.

Figure 4C:
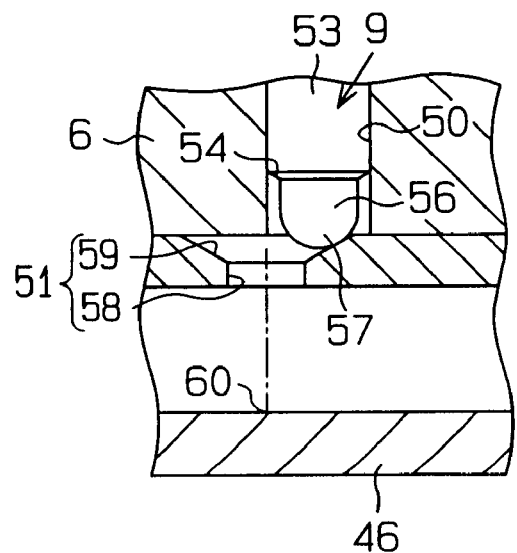
Figure 4D:
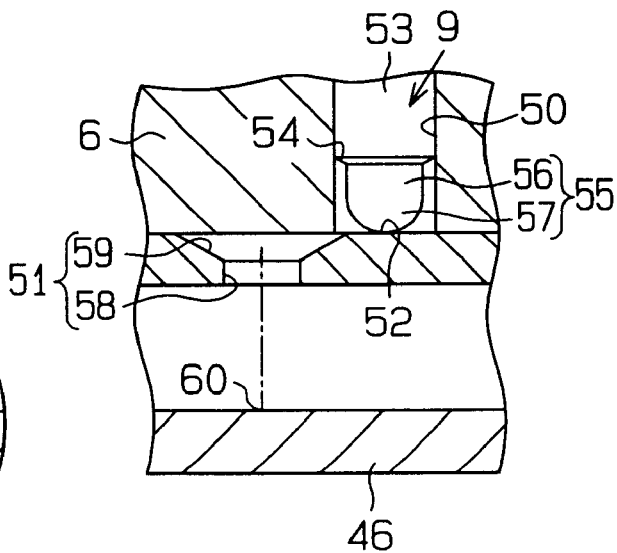

As shown in FIGS. 2, 3, 4(a) and 4(d), the bottom plate 46 of the unlocking cylinder 8 has a disengaging face 60, which can contact the engaging pin 9. When the engaging pin 9 is in the engaging position Q9 (see FIG. 2) and when the unlocking cylinder 8 is moved toward the collar 26 to abut the disengaging face 60 with the engaging pin 9, the pin 9 is pressed upward against the force of the coil spring 10 (see FIGS. 3 and 4(b)). This brings the rounded tip 57 into engagement with the boundary between the engaging face 58 and the tapered face 59 of the engaging hole 51. Thus, as shown in FIGS. 4(c) and 4(d), the torsion spring 7 urges the small-diameter portion 55 to disengage from the engaging hole 51, and the rounded tip 57 engages the tapered surface 59. Then, the engaging pin 9 moves to the nonengaging position 9P, as shown in FIGS. 5 and 7(b), and the rounded tip 57 engages the upper face 52 of the collar 26.

Next, the steps of mounting the cutter 3 to the tool holder 2 will be described.

FIG. 2 shows a state where the shank 14 is inserted in the supporting hole 27 of the supporting cylinder 4. However, the cutter 3 is not yet locked in the holder 2. In this state, the head 22 of the centering pin 12 is abutted against the bearing face 29. The first outer circumferential surface 18 of the shank 14 is radially aligned with the first inner circumferential surface 32 of the main barrel 24 and a clearance exists between them. The second outer circumferential surface 20 of the shank 14 contacts the second inner circumferential surface 34 of the main barrel 24. Each locking ball 5 is positioned between the associated locking dent 21 and the associated unlocking face 40 in the unlocking state (FIG. 6(a)). The coil spring 10 holds the engaging pin 9 in the engaging hole 51 of the collar 26. That is, the engaging pin 9 is located in the engaging position Q9 where it prevents the supporting cylinder 4 and the locking cylinder 6 from rotating relative to each other, which holds the locking cylinder 6 in the locking position P6 (FIG. 7(a)). The unlocking cylinder 8 is spaced a predetermined distance away from the collar 26 when in a standby position shown in FIG. 2.

When the unlocking cylinder 8 is moved toward the collar 26, the engaging pin 9 is pushed up against the force of the coil spring 10 (see FIG. 3) to disengage from the engaging hole 51. Consequently, as shown in FIGS. 5, 6(b) and 7(b), the cutter tool 3 is locked to the tool holder 2.

That is, the torsion spring 7 rotates the locking cylinder 6 into the locking position Q6. Thus, each locking ball 5 is pushed radially inward by the associated locking face 39 and enters the associated locking dent 21. The engaging pin 9 is located in the nonengaging position P9 where it permits the locking operation cylinder 6 to rotate.

Next, the steps of removing the cutter tool 3 from the holder 2 will be described. First, the locking operation cylinder 6 is turned clockwise (from the perspective of FIGS. 6(a) and 6(b)) against the force of the torsion spring 7. This brings the engaging pin 9 from the position shown in FIG. 7(b) to the position shown in FIG. 7(a) or to the engaging position Q9, and thus the cutter 3 can be released from the tool holder 2 as shown in FIGS. 2, 6(a) and 7(a). In this state, the cutter 3 can also be inserted to the tool holder 2.

The present invention has the following advantages.

Engagement of the engaging pin 9 with the engaging hole 51 of the collar 26 securely holds the locking operation cylinder 6 in the unlocking position P6 with respect to the supporting cylinder 4. Therefore, the locking balls 5 are securely held in their unlocking position. As a result, the cutter tool 3 can be readily attached and removed.

The engaging pin 9 is not in the supporting cylinder 4 but is in the locking cylinder 6. This simplifies the structure in the supporting cylinder 4.

The unlocking cylinder 8 can move the engaging pin 9 from the engaging position Q9 to the nonengaging position P9 easily.

The torsion spring 7 urges the locking cylinder 6 to move automatically to the locking position Q6 and also securely holds the engaging pin 9 in the engaging position Q9.

If the engaging pin 9 is disengaged from the engaging hole 51, the coil spring 10 moves the engaging pin 9 to the engaging position Q9.

The outside diameter D18 of the first outer circumferential surface 18 of the shank 14 is smaller than the outside diameter D20 of the second outer circumferential surface 20 of the shank 14, thus the shank 14 is guided into the supporting hole 27 easily. This facilitates attachment of the cutter tool 3 to the tool holder 2.

In addition, the supporting hole 27 of the supporting cylinder 4 includes a first inner circumferential surface 32, which is radially spaced from the first outer circumferential surface 18 by a predetermined clearance, and a second inner circumferential surface 34 contacts the second outer circumferential surface 20. This further facilitates insertion of the shank 14 into the supporting hole 27. Since the second outer circumferential surface 20 contacts the second inner circumferential surface 34, the shank 14 is firmly held in the supporting hole 27.

The locking dents 21 are formed only on the first outer circumferential surface and they do not extend to the second outer circumferential surface 20. This enables smooth insertion of the shank 14 into the supporting hole 27 whether or not the balls 5 protrude slightly from the first inner circumferential surface 32 into the supporting hole 27. In other words, the degree of freedom of arranging the balls 5 in the unlocking state is increased. Further, the configuration of the shank 14 can be designed relatively easily.

It should be apparent to those skilled in the art that the present invention may be embodied in many other specific forms without departing from the spirit or scope of the invention. Particularly, it should be understood that the invention may be embodied in the following forms.

Figure 8A:
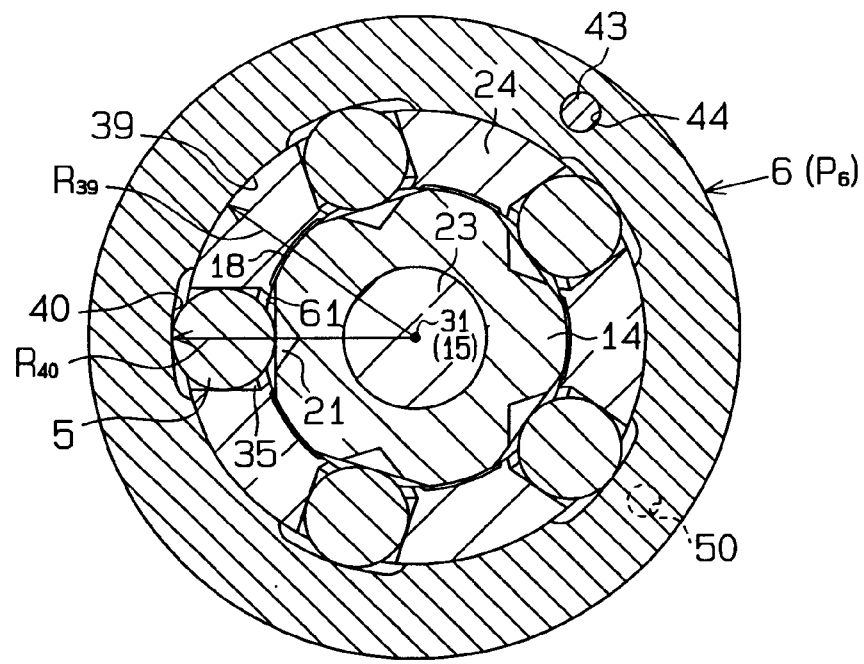
FIG. 8(a) is a cross-sectional view of a second embodiment corresponding to FIG. 6(a)
Figure 8B:
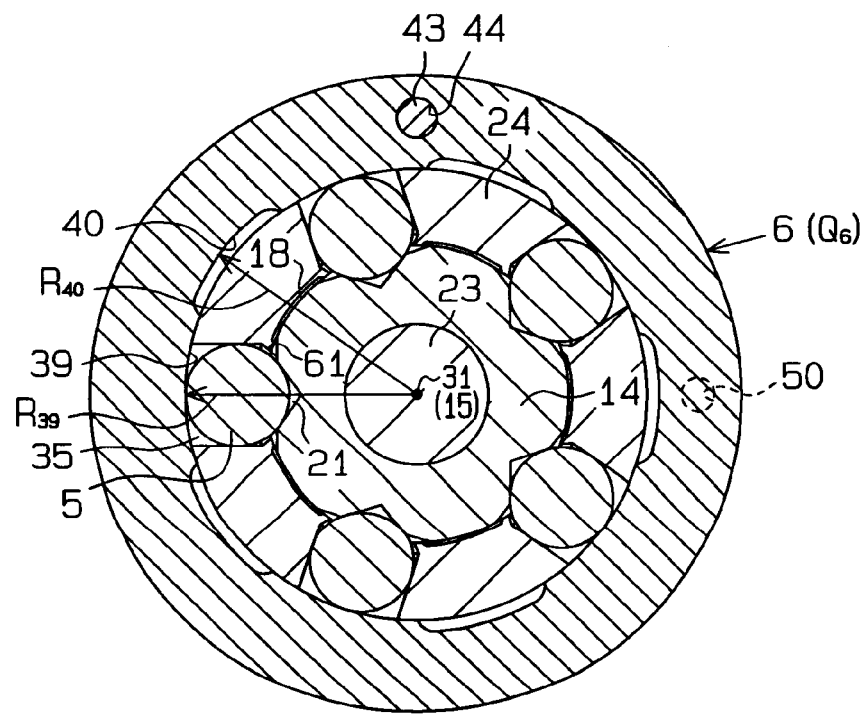
FIG. 8(b) is a cross-sectional view of the second embodiment corresponding to FIG. 6(b)
Figure 9:
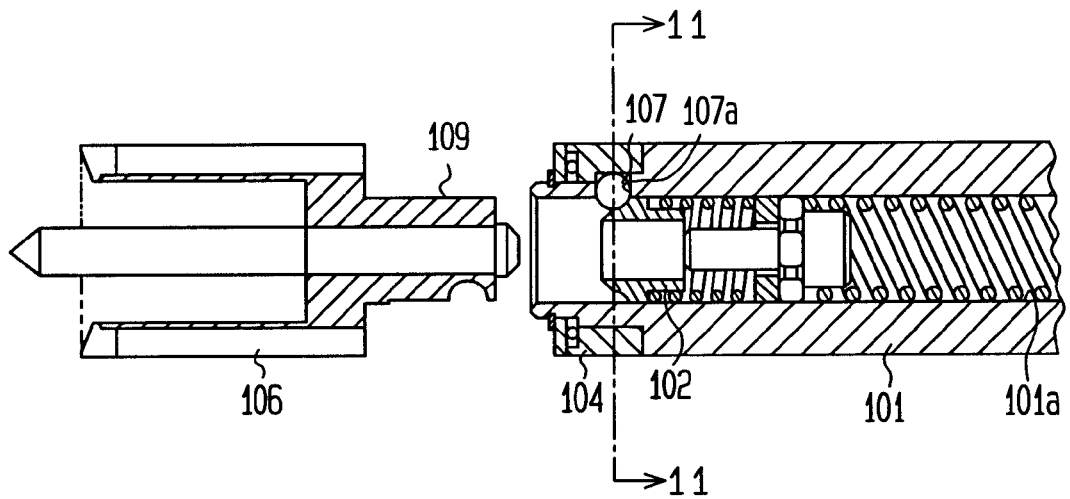
FIG. 9 is a cross-sectional side view of a prior art cutter tool, and tool holder in an unlocked state.
Figure 10:
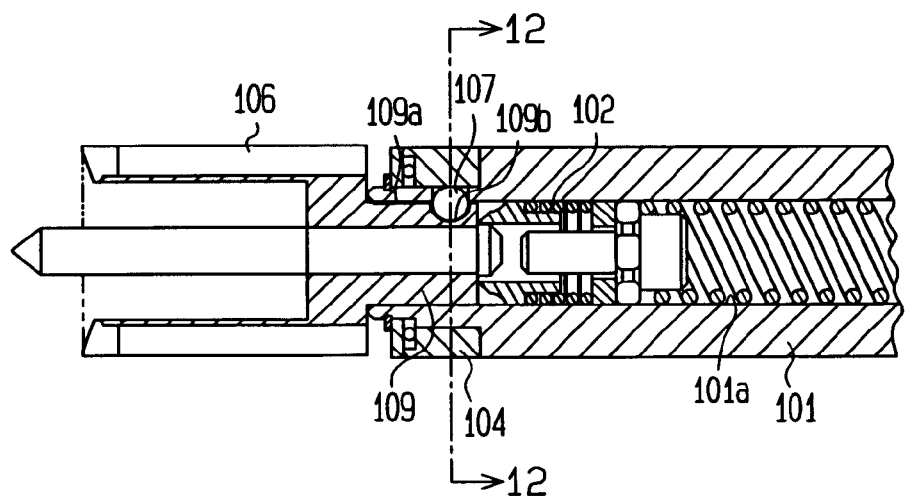
FIG. 10 is a side cross-sectional view showing the tool and tool holder of FIG. 9 in a locked state.
Figure 11:
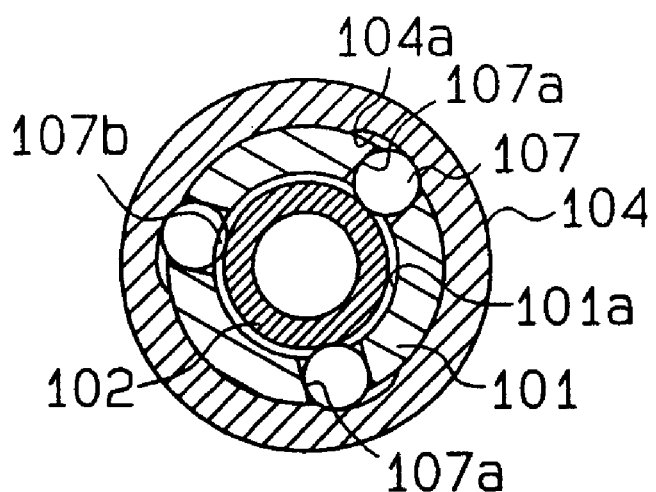
FIG. 11 is a cross-sectional view taken along the line 11—11 in FIG. 9.
Figure 12:
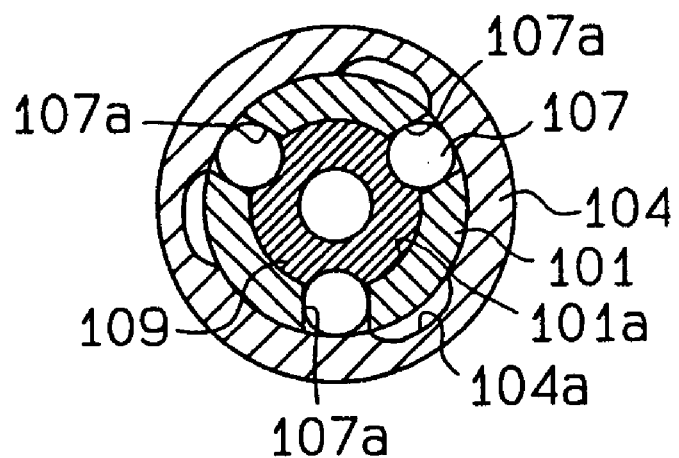
FIG. 12 is a cross-sectional view taken along the line 12—12 in FIG. 10.
Figure 13A:
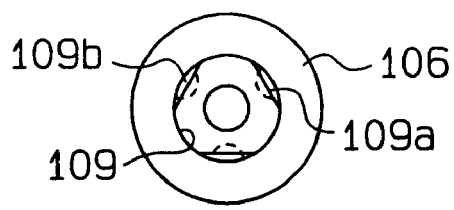
FIG. 13(a) shows a front view of the cutter shown in FIG. 9.
Figure 13C:
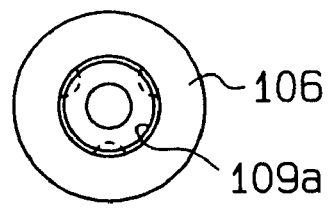
FIG. 13(c) shows a plan view a front view of another prior art cutter tool.
Figure 13B:
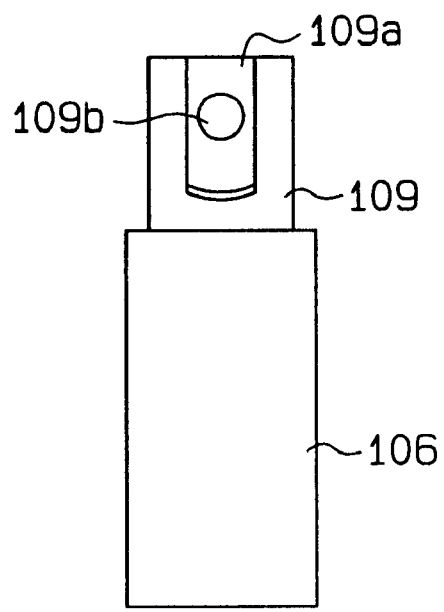
FIG. 13(b) shows a plan view of the cutter shown in FIG. 13(a)
Figure 13D:
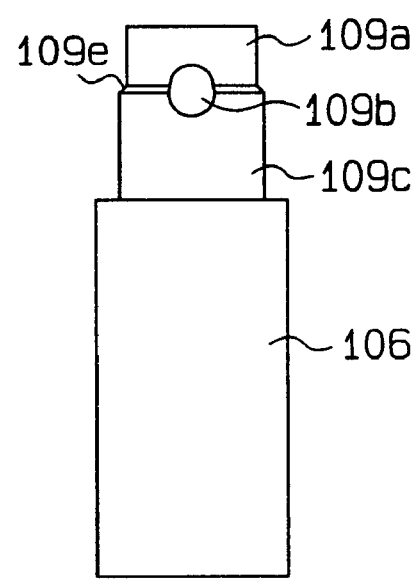
FIG. 13(d) shows a plan view of the cutter tool of FIG. 13(c).

In a second embodiment shown in FIGS. 8(a) and 8(b), flat faces 61 are formed on the first outer circumferential surface 18 of the shank 14 at positions corresponding to the locations where locking detents 21 are formed, respectively. The distance from each wall 61 to the rotational axis line 15 is less than the distance from the first outer circumferential surface 18 to the axis line 15. The locking balls 5, when abutted against the unlocking face 40, protrude from the first inner circumferential surface 32 of the main barrel 24 into the supporting hole 27 by a radial distance that does not permit locking of the shank 14. The radial protrusion distance in this embodiment is greater than that of the first embodiment.

The number of locking balls 5 is not limited to five, but is at least one.

The present invention can be applied not only to the annular cutter tool 3 but to other boring cutters such as drills and reamers.

It should be apparent to those skilled in the art that the present invention may be embodied in many other specific forms without departing from the sprit or scope of the invention.

Therefore, the present examples and embodiments are to be considered as illustrative and not restrictive and the invention is not to be limited to the details given herein, but may be modified within the scope and equivalence of the appended claims.

What is claimed is:

1. A tool holder for holding a shank of a cutter tool, the tool holder comprising:
   a supporting cylinder, wherein a supporting hole that receives the shank is formed in the supporting cylinder;
   a locking body that moves between a locking position and an unlocking position;
   a locking member supported by the supporting cylinder, wherein, when the locking body is located in the locking position, the locking member is moved radially inward with respect to the supporting cylinder by the body to engage with the shank, wherein, when the locking body is located in the unlocking position, the locking member is allowed to move in the radially outward direction of the supporting cylinder to release the shank;
   an engaging member located between the supporting cylinder and the locking body, wherein the engaging member moves between an engaging position, at which the engaging member locks the locking body with respect to the supporting cylinder, and a disengaging position, at which the engaging member releases the locking body from the supporting cylinder, wherein, when the engaging member is in the engaging position, the locking body is prevented from moving relative to the supporting cylinder and is held in the unlocking position, and when the engaging member is in the disengaging position, the locking body is allowed to move relative to the supporting cylinder, said engaging member being supported to move axially and said supporting cylinder having an engagement hole for receiving the engaging member, wherein the engaging member aligns with the engagement hole when the locking body is located in the unlocking position; and
   an unlocking body for moving the engaging member toward the disengaging position, and wherein the unlocking body is moveable independent from and relative to the shank.

2. The tool holder according to claim 1 further comprising an urging member for urging the engaging member toward the engaging position.

3. The tool holder according to claim 1 further comprising an urging member for urging the locking body toward the locking position.

4. A tool assembly comprising:
   a cutter tool having a shank, wherein the shank has a large diameter section and a small diameter section, wherein the small diameter section is adjacent to the large diameter section and is located at the distal end of the shank; and
   a tool holder for attaching the shank, the tool holder comprising:
      a supporting cylinder, wherein the supporting cylinder has a supporting hole, wherein the shank of the cutter is detachably inserted in the supporting hole, wherein an inner wall that defines the supporting hole has a first inner wall corresponding to the small diameter section of the shank and a second inner wall contacting with the large diameter section of the shank, wherein the diameter of the first inner wall is smaller than the diameter of the second inner wall;
      a locking body supported to move between a locking position and an unlocking position;
      a locking member supported by the supporting cylinder to move in the radial direction, wherein, when the locking body is located in the locking position, the locking member moves to an inner side of radial direction by the locking body to engage with the shank, wherein, when the locking body is located in the unlocking position, the locking member is allowed to move to an outer side of radial direction to release from the shank;
      an engaging member located between the supporting cylinder and the locking body, wherein the engaging member moves between an engaging position at which the engaging member engages the locking body to the supporting cylinder and a disengaging position at which the engaging member releases the locking body from the supporting cylinder, wherein, when the engaging member is located in the engaging position, the locking body is prevented from moving relative to the supporting cylinder and is held in the unlocking position, wherein, when the engaging member is in the disengaging position, the locking body is allowed to move relative to the supporting cylinder, said engaging member being supported to move axially and said supporting cylinder having an engagement hole for receiving the engaging member, wherein the engaging member aligns with the engagement hole when the locking body is located in the unlocking position; and
      an unlocking body for moving the engaging member toward the disengaging position, and wherein the unlocking body is moveable independent from and relative to the shank.

5. The cutting unit according to claim 4, wherein the supporting cylinder has a hole for opening toward the first inner wall and accommodating the locking member.

6. The tool holder according to claim 1, wherein the locking body is cylindrical and rotates about the supporting cylinder.

7. The tool holder according to claim 6, wherein the locking body has an annular end surface, and a guide hole is formed in the annular end surface, wherein the engaging member is accommodated in the guide hole, wherein the supporting cylinder includes an engagement hole that faces the end surface of the locking body, wherein the engaging member enters the engagement hole when the locking body is located in the unlocking position.

8. The tool holder according to claim 7 further comprising an unlocking body for pressing the engaging member out of the engagement hole, wherein the unlocking body is located to face the annular end surface of the locking body.

9. A cutter tool that fits in a tool holder, wherein the tool holder comprises a supporting cylinder having a supporting hole that receives a shank of the cutter, a locking member for engaging the shank such that the locking member holds the shank in the supporting hole, and an engaging member located between the supporting cylinder and the locking body, wherein the engaging member moves between an engaging position, at which the engaging member locks the locking body with respect to the supporting cylinder, and a disengaging position, at which the engaging member releases the locking body from the supporting cylinder, wherein, when the engaging member is in the engaging position, the locking body is prevented from moving relative to the supporting cylinder and is held in the unlocking position, and when the engaging member is in the disengaging position, the locking body is allowed to move relative to the supporting cylinder, and an unlocking body for moving the engaging member toward the disengaging position, and wherein the unlocking body moves relative to the shank, said engaging member being supported to move axially and said supporting cylinder having an engagement hole for receiving the engaging member, wherein the engaging member aligns with the engagement hole when the locking body is located in the unlocking position, the cutter tool further comprising:

a large diameter section for contacting an inner wall that defines the supporting hole; and a small diameter section, the diameter of which is smaller than that of the large diameter section, wherein the small diameter section is adjacent to the large diameter section and is located at the distal end of the shank, wherein a recess is located entirely in the small diameter section, and the locking member enters the recess.

10. The cutting unit according to claim 4, wherein a recess is located entirely in the small diameter section of the shank, wherein the locking member enters the recess.

* * * * *